UNITED STATES PATENT OFFICE.

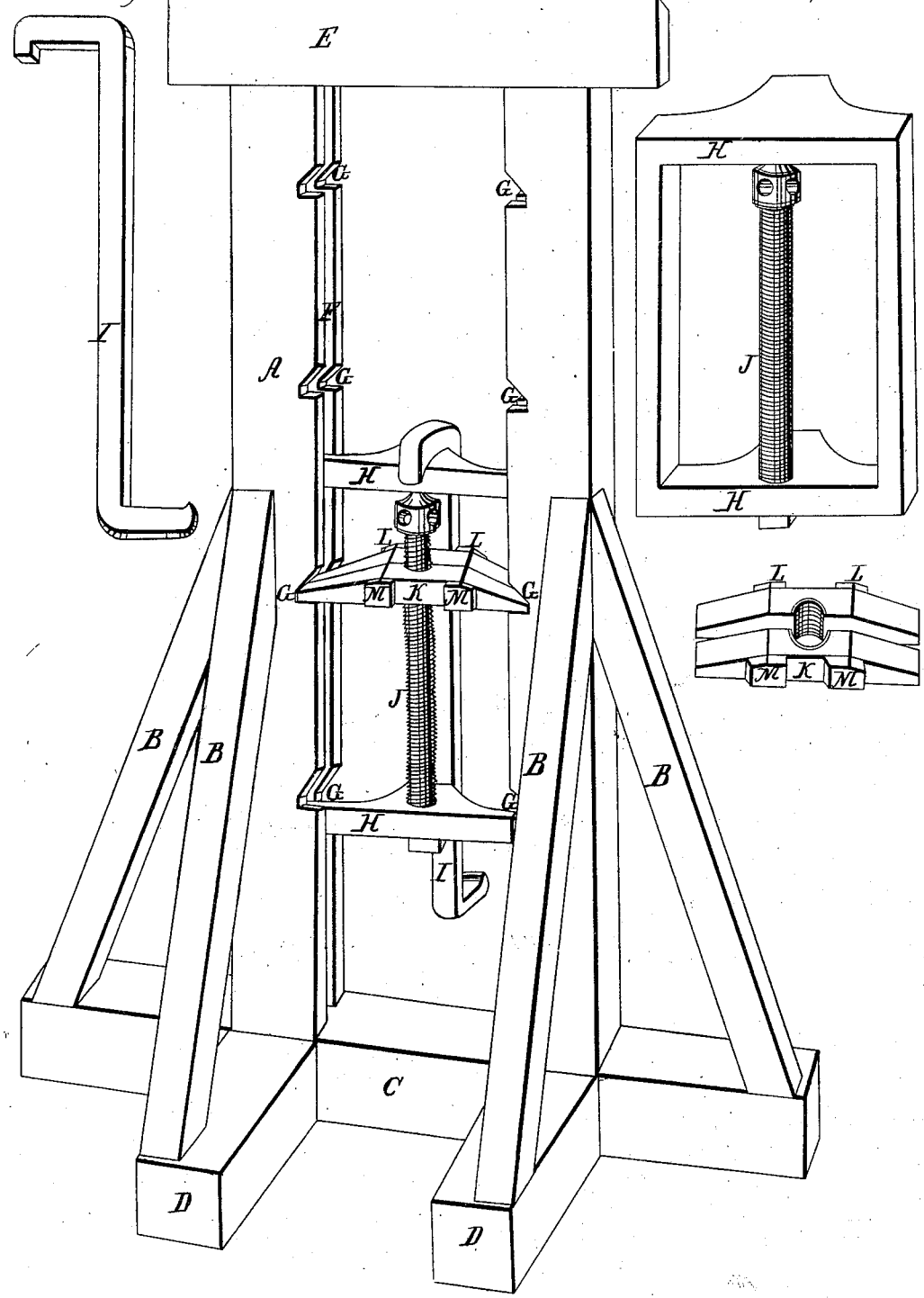

FREDERICK NICHOLSON, OF WARSAW, NEW YORK, ASSIGNOR TO NELSON A. HUME.

SCREW-JACK FOR RAISING BUILDINGS.

Specification of Letters Patent No. 10,291, dated November 29, 1853.

*To all whom it may concern:*

Be it known that I, FREDERICK NICHOLSON, of the town of Warsaw, in the county of Wyoming, State of New York, have invented a new and useful Machine for Raising Buildings from their Foundation-Walls; and I do hereby declare that the following is a full, clear, and exact description of the same, reference being had to the accompanying drawings and to the letters of reference marked thereon.

In the said drawings, the letters, A, B, C, D, and E, indicate a profile view of the principal frame; F, grooves along the inside of the upright parts of said frame; H, a small sliding frame, which is fitted to the said grooves, and holds a screw, J, at each end, by means of pivots; G, notches in the uprights of the principal frame, A, in which notches the nut, K, rests when the screw is to be worked; I, a hook, turned in opposite directions at the opposite ends, and suspended from the top of the movable frame, H, in operating the machine; J, the elevating screw; K, the sustaining nut, as mentioned above; L, small bolts for holding together the nut, K, which is composed of two parts, being divided by a longitudinal section parallel to the axis of the screw, J; M, nuts on the small bolts, L.

The nature of my invention is such, that a building may be elevated to any required height, by means of a screw of convenient length, (say two feet, more or less,) without blocking up during the process.

To enable others to profit by the use of my invention, I will proceed to describe the construction and management of a machine after the pattern of the model.

I construct the principal frame, A, of the proper strength, and of a height sufficient for all ordinary service. In the grooves, F, of the principal frame, I place the small sliding frame, H, so fitted that it may easily move up and down along said grooves, the length of this small frame being just sufficient to hold the screw, J, at its extremities. I then adjust the nut, K, in the notches, G, near the top of the screw, J,—this nut being divided, as already indicated, into two parts by a longitudinal section parallel to the axis of the screw, J, and held together by the bolts, L, and small nuts, M, and also being perforated with a screw thread, cut to the screw, J. The hook, I, is next to be placed on the frame, H, directly over the top of screw, J. The bottom of the hook reaches below the bottom of the frame, H, and, as it turns in the opposite direction from the top, it passes under the sill of the building to be raised. The screw is then to be run up its length, by means of a lever passing through its head, which is perforated for this purpose. The building thus suspended upon hook, I, is carried up the length of the screw. A second nut, K, is then to be placed into the notches, G, near the top of screw, J,—these notches being cut at such intervals as to correspond to the working length of the screw; the lower nut, K, is then to be removed, and the screw to be run up as before. Proceed thus until the required height is attained.

What I claim, therefore, as my invention, and wish to secure by Letters Patent, is,

The peculiar combination and employment of the hook, I,—the lifting frame, H,—the screw, J,—the divided nuts, K,—and the supporting frame, A;—their combination being such, that, by the alternate employment of a pair of divided nuts, K, held stationary in transverse notches, G, of the supporting frame, A, the screw, J, may be continued up to any desired height, carrying with it the lifting frame, H, in which it is confined, and which slides in the longitudinal grooves of the supporting frame, A, and carries along with itself, the hook, I, substantially as herein described.

F. NICHOLSON.

Witnesses:
H. B. GILBERT,
N. A. HUME.